Figure 1:
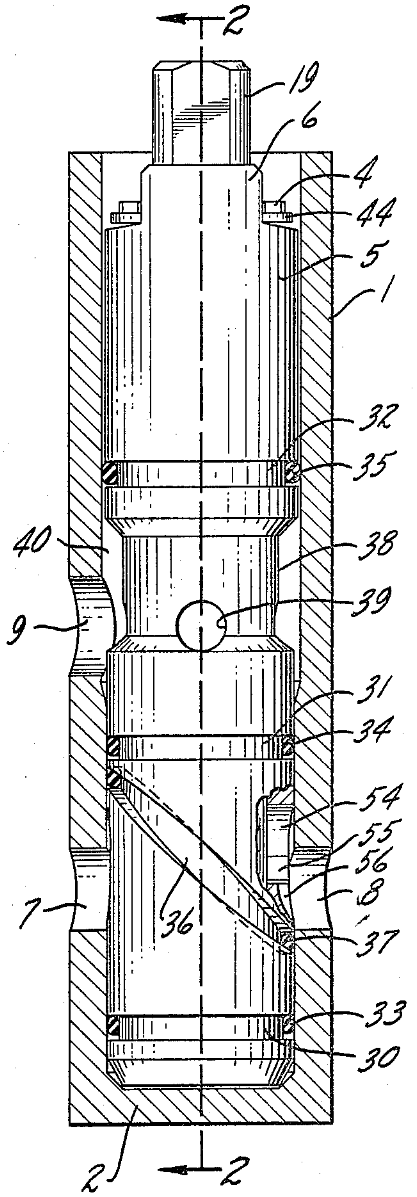

Nov. 15, 1966 W. D. CORLETT 3,285,278

R CARTRIDGE SEAL DESIGN AND ARRANGEMENT

Filed Jan. 20, 1964 2 Sheets-Sheet 1

INVENTOR.
Webster D. Corlett,
BY Parker & Carter
Attorneys.

Nov. 15, 1966 W. D. CORLETT 3,285,278

R CARTRIDGE SEAL DESIGN AND ARRANGEMENT

Filed Jan. 20, 1964 2 Sheets-Sheet 2

INVENTOR.
Webster D. Corlett,
BY Parker & Carter
Attorneys.

United States Patent Office 3,285,278
Patented Nov. 15, 1966

3,285,278

R CARTRIDGE SEAL DESIGN AND ARRANGEMENT

Webster D. Corlett, River Forest, Ill., assignor to Standard Screw Company, Bellwood, Ill., a corporation of Illinois Filed Jan. 20, 1964, Ser. No. 338,800
3 Claims. (Cl. 137—454.2)

This invention relates to a cartridge assembly for use in mixing faucets and primarily to an assembly for use in single handle mixing faucets.

It has for one object to provide a cartridge which includes a valve sleeve and a valve stem mounted within the sleeve for rotation and reciprocation, and particularly to provide sealing means within the sleeve.

Another object is to provide in connection with a sleeve of the type indicated, means for pressure balancing the movable valve stem and also to provide means for balancing or controlling the effect upon the valve stem due to the weight of an operating handle for the valve stem.

Other objects will appear in the ensuing drawings, specification and claims.

Figure 2:
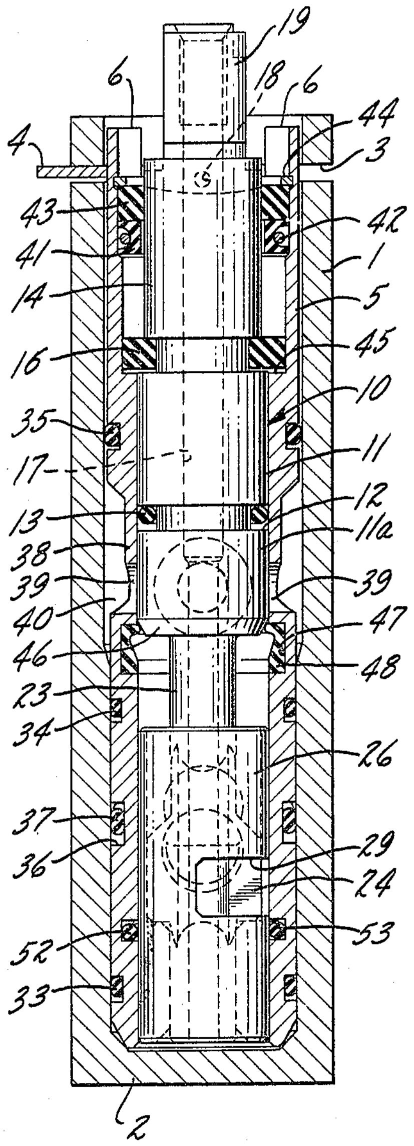
Figures 3, 4, 5, 6, 7:
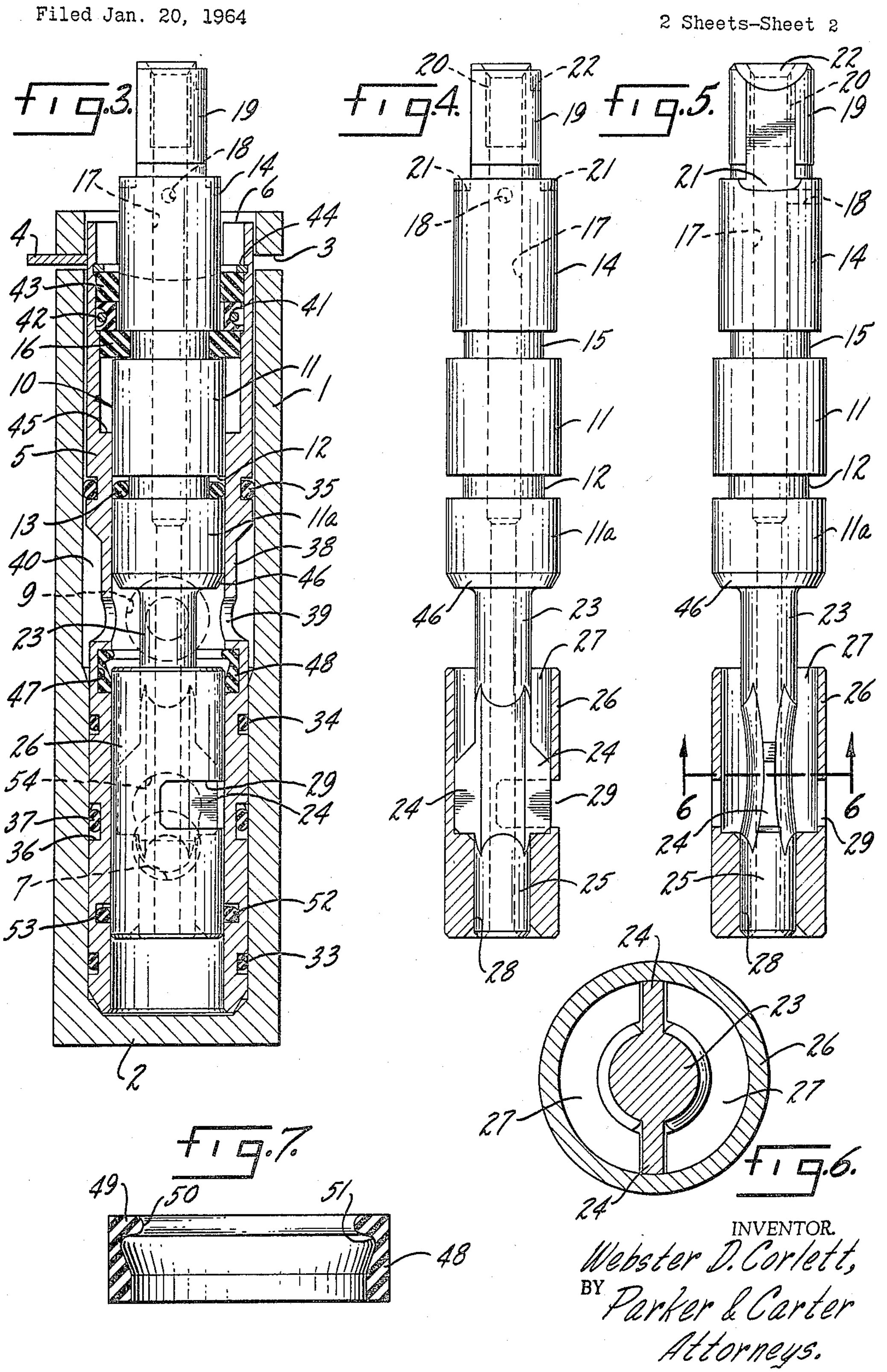

The invention is illustrated diagrammatically in the drawings wherein:

FIGURE 1 is a longitudinal section through a housing within which the cartridge is positioned, the cartridge being shown in elevation with a detail broken away and in section, FIGURE 2 is a view showing the structure of FIGURE 1 with the housing in which the cartridge is inserted and the sleeve of the cartridge and other parts shown in section with the valve stem being shown in elevation, FIGURE 3 is a view similar to FIGURE 2 but showing the valve stem in a different position of adjustment, FIGURE 4 is a side elevation of the valve stem with the valve piston shown in section, FIGURE 5 is a view similar to FIGURE 4 but showing parts rotated throughout 90°, FIGURE 6 is a transverse section taken on an enlarged scale at line 6—6 of FIGURE 5, and FIGURE 7 is a section of the valve sealing means taken on an enlarged scale.

Like parts are indicated by like numerals throughout the specification and drawings.

In the particular form shown the valve cartridge assembly is removably mounted in a housing 1 which forms a permanent part of the installed plumbing fixed within or supported from a permanent support. As shown, the housing 1 is closed at 2. Generally the housing 1 will be enclosed within a wall or otherwise concealed. The housing is slotted at 3 to receive a key 4 by which the valve sleeve 5 is held in place within the housing 1. The valve sleeve 5 is shaped, as at 6, to be engaged or straddled by the bifurcated clip 4.

The housing 1 is provided with inlet ports 7 and 8. Each is permanently connected to a water supply pipe as shown in FIGURE 1. Usually hot water will enter the housing 1 through one port, for example the port 7, and cold water will enter through the other port 8. Thus hot and cold water are supplied to the housing 1 and may move to the valve assembly and through it when the valve is in position to permit entry of the liquid as described above. The housing 1 is provided with an outlet port 9 which may be connected to a spout or other suitable passage forming member through which mixed hot and cold water are discharged. No particular spout is shown because the invention is not limited to any particular spout. It is sufficient for purposes of the present invention that there be provided inlet ports to the housing 1 and a discharge port from the housing.

The valve cartridge comprises a sleeve 5, which as mentioned above, is normally fixed in relation to the housing 1. Within the sleeve 5 is a valve stem which is mounted therein for rotation and reciprocation. The valve stem is, as shown particularly in FIGURES 2 through 5 inclusive, formed of different diameters. The stem is designated generally by the numeral 10.

As shown, there are two portions 11 and 11a of the same diameter. A groove 12 is provided between these portions to receive an O-ring 13. A portion 14 of somewhat reduced diameter is separated from the portion 11 by a groove 15 within which a stop member 16 is positioned. A passage 17 runs from the inner end of the valve stem toward the outer end and communicates with a passage 18 which extends through the valve stem portion 14 to the atmosphere.

The valve stem is reduced in diameter, as at 19, and is given an angular shape to receive an operating handle. The portion 19 may also be bored and internally threaded as at 20. The outer surface of the member 19 may be provided with two oppositely placed depressions 21 and a depression 22 may, if desired, be provided on the outer end of the reduced portion 19 along one side.

The valve stem may be still further reduced, as at 23, and may be provided with a pair of oppositely placed, outwardly extending ports 24, 24. The valve stem is reduced again at 25.

A generally cylindrical valve piston is positioned about the portions 23 and 25 of the valve stem and in contact with the valve stem members 24, 24. The valve piston 26 is, as shown particularly in FIGURES 4, 5 and 6, enlarged internally, as at 27, to form liquid passages and it is reduced in diameter, as at 28, where it closely embraces the portion 25 of the valve stem. The valve piston 26 is cut away to provide an inlet port 29 which as shown in FIGURE 4 particularly extends about the valve piston preferably for substantially more than half of the diameter of that member. The valve piston is secured to the valve stem in the position shown in detail in FIGURES 4 and 5 by soldering, braising, or by any other suitable means. Thus, the valve stem and the valve piston 26 are permanently secured together and the piston is moved by the movement of the stem.

The valve sleeve 5 is provided with a number of external grooves. Thus there are grooves 30, 31 and 32 in which may be positioned O-rings 33, 34 and 35 respectively. A diagonal groove 36 may be formed in the exterior of the sleeve 5 and when present will receive a diagonally positioned O-ring 37.

The valve sleeve 5 is reduced about its exterior, as at 38, and is provided with one or more outlet ports 39, 39. The reduced portion 38 forms with the housing 1 an annular space 40 into which the ports 39 discharge liquid when the valve is open. The port 9 discharges water from the space 40.

As mentioned above, the valve sleeve is secured in place in the housing 1 by the clip 4. The O-rings 33, 34 and 35 seal the valve sleeve 5 and thus the total cartridge within the housing 1. The diagonal O-ring 37 acts as a sealing means between the liquid inlet ports 7 and 8.

As pointed out above, the valve stem is mounted for reciprocation and rotation and it may be actuated by a handle secured to the portion 19. This handle may be in the form of a lever or a knob. No handle is shown because the present invention is not limited to a handle or any particular form of handle.

The stop member 16 has been mentioned above. It contacts the brake member 41 and limits the outward movement of the valve stem in the opening direction. The parts are shown in this position FIGURE 3. The brake may comprise a single ringlike member which is split and may be flexed inwardly or it may comprise two or more sections forming together a ringlike part.

Whatever the precise details of the brake may be, it will preferably be formed with an external groove within which a spring 42 is positioned. The spring serves to compress the brake members inwardly and thus hold them in contact with the valve stem for the necessary braking effect upon that member.

A bearing 43 is formed within the sleeve 5 in contact with the valve stem position 14. It serves as a bearing for the valve at this point. A snap ring or other equivalent member 44 is positioned above the valve stem and engages the bearing 43 and prevents its outward movement. The snap ring is engaged in grooves in the upstanding earlike portions 6 of the sleeve 5. Thus when the snap ring is in place, the valve stem cannot be pulled outwardly from the sleeve 5 and its outward movement is limited by contact of the stop 16 with the brake 41. The inward movement of the valve stem is limited by contact of the stop 16 with a shoulder 45 formed within the sleeve 5.

The valve stem or valve portion 11 is provided with an inclined seating portion 46. The valve sleeve is provided, as shown in FIGURES 2 and 3, with a groove 47. Although this groove is shown as being generally rectangular in profile, it is not limited to this shape. Positioned within the groove 47 is a sealing member 48. This member is shown generally cylindrical in shape to correspond with the shape of the groove 47. It is provided with an inwardly directed flange 49 which may have a rounded sealing portion 50. As shown, the portion 50 is of semicircular profile but it may have any shape which will make a sealing contact with the seating portion 46 of the member 11*a*.

The sealing member 48 is internally enlarged or relieved at 51. This internal diameter is increased adjacent the member or portion 49, 50.

When the valve stem is to be inserted in the sleeve, the sealing member 48 is put into the position shown in FIGURES 2 and 3. An O-ring 52 is inserted in the groove 53. When now the valve stem is moved from the outer end of the sleeve 5 into that sleeve, the valve piston 26 will contact the portion 50 of the sealing member 48 and will bend it downwardly into the enlarged portion 51. Thus the portion 51 permits ready assembly of the stem within the sleeve and permits the piston 26 to move bodily downwardly or inwardly beyond the sealing member 48. When this movement has occurred, the portion 50 is free to move out of the relieved cavity or groove 51 and to resume the position shown in FIGURES 2, 3 and 7. It returns to its original position because it is formed of elastic material.

The valve sleeve 5 is provided with ports which communicate with the liquid inlet ports 7 and 8. There will be one such port in the sleeve 5 for each of the inlet ports. One is shown in section in FIGURE 1. There is thus the port 54 formed in the wall of the sleeve 5. It may if desired be given generally straight side walls 55 and an outer portion of the sleeve 5 communicating with the ports 54, 55 is tapered or inclined as at 56.

If desired, the ports 54 may be made so that they will be directly opposite the inlet ports 7 and 8. If that were done, the tapered portions 56 might be omitted. Whatever the size or shape of the inlet ports 54 in the valve sleeve 5 may be, there are two such ports; one for each inlet port.

The use and operation of the invention are as follows:

The valve cartridge assembly is completed when the valve stem has been inserted in the sleeve and the snap ring has been put in place to prevent separation of the valve stem from the sleeve. The cartridge may thereafter be installed or removed by treating it as a unit. The cartridge is thus inserted into the housing 1 which is a permanent portion of the water supply or plumbing system. The cartridge, once it has been moved fully inwardly as shown in FIGURES 1, 2 and 3, is secured in place by the clip 4 or by other equivalent means. The sleeve will thus be held motionless when the stem within it may be rotated by any desired form of handle or may be reciprocated throughout the limits provided by the stop.

When the valve stem is in position, as in FIGURE 2, the port 29 of the piston 26 is below inlet ports 7 and 8 and below the inlet ports 54. Thus, the valve stem is closed, liquid cannot enter it or pass through it. In this position also the part 46 or the valve stem member 11*a* is seated upon the portion 50 of the sealing member 48.

If it is now desired to open the valve, the stem is moved away from the position of FIGURE 2 to or toward the position of FIGURE 3. When that occurs, the port 29 of the piston is raised so that it is in register with the inlet ports 54 in the sleeve 5. Water may then enter and pass through the ports 54 to the interior of the piston 26. Thence it moves through the piston 26 and the discharge ports 39 and into the annular chamber 40. From that chamber, liquid is discharged through the outlet port 9 to a spout or other connection for discharge or to be conducted to some suitable place for use.

The pressure of liquid flowing through the opened valve has been known to displace or distort sealing members within the cartridge sleeve. The shape of the member 48 prevents that. This member is additionally held against displacement when the faucet is open by the fact that in the open position the valve piston 26 moves as shown in FIGURE 3 into the sealing member 48 and thus moves above its lower margin and serves to retain the sealing member 48 against displacement no matter what the water pressure of the water flowing through the sleeve may be. When the piston 26 is at or near the position of FIGURE 3, displacement of the seal 48 is made impossible by the overlapping relationship of the piston 26 with the seal 48.

With the valve open, the user will rotate the valve stem so as to bring a suitable portion of the port 29 in register with one or both of the inlet ports 54 in the cartridge sleeve 5. The size of the port 29 is such that it may be brought into communication with only one of the inlet ports 54 or to a varying degree with both of them. Thus the rotary adjustment of the valve piston controls the relationship of hot water to cold water and hence accomplishes suitable mixing and gives the desired temperature of the water which is discharged through the outlet port 9.

Whereas the preferred form of the invention has been shown and described herein, it should be realized that there are many modifications, substitutions and alterations thereto, within the scope of the following claims.

I claim:

1. In combination in a valve assembly comprising a valve housing having a cylindrical bore and provided with fluid inlet and outlet means, an annular groove formed in the inner surface of said bore, a valve stem reciprocable within the bore and having first and second valve members secured thereto in spaced relation, and a generally cylindrical sealing member positioned within said groove, said sealing member being shaped to define adjacent one end thereof an internal retaining portion, the internal diameter of which is dimensioned to maintain retaining engagement with one of said valves, and being provided adjacent its other end with an inwardly directed flange defining a terminal valve seat, said sealing member being formed of flexible material and being of reduced thickness adjacent to said flange; said valves being spaced apart such distance that only one of said valves is in position to cooperate with said sealing member at a time, one of said valves being within said retaining portion in retaining relation therewith and out of contact with said flange in one position of valve adjustment, the other of said valves being seated against said flange in another position of adjustment and out of contact with said retaining portion.

2. The device of claim 1 characterized in that said flange terminates in a rounded edge.

3. In combination in a valve assembly comprising a valve housing, a cylindrical sleeve member mounted within said housing, fluid inlet and an outlet means providing for fluid flow through said housing and sleeve, said sleeve having an annular groove in its inner surface and a pair of spaced valve members mounted within said sleeve for rotation and reciprocation, a sealing member mounted in said groove, said sealing member being generally cylindrical and formed of flexible material, said sealing member being shaped to define adjacent one end thereof an internal retaining portion of substantially the same diameter as the inner diameter of said sleeve and being provided adjacent its other end with an inwardly directed flange defining a terminal valve seat; said valves being spaced apart such distance that only one of said valves is in position to cooperate with said sealing member at a time, of said valves one being within said retaining portion in retaining relation therewith and out of contact with said flange in one position of valve adjustment, the other of said valves being seated against said flange in another position of adjustment and out of contact with said retaining portion.

References Cited by the Examiner

UNITED STATES PATENTS

| | | | |
|---|---|---|---|
| 2,328,578 | 9/1943 | Payne | 277—206 X |
| 2,585,556 | 2/1952 | Johnson. | |
| 2,659,568 | 11/1953 | Grove. | |
| 2,661,182 | 12/1953 | Kipp | 137—625.69 X |
| 2,989,989 | 6/1961 | Whaley | 137—625.69 |
| 3,103,231 | 9/1963 | Moen | 137—45 |

FOREIGN PATENTS

| | | |
|---|---|---|
| 901,761 | 7/1962 | Great Britain. |

WILLIAM F. O'DEA, *Primary Examiner.*

ISADOR WEIL, MARTIN P. SCHWADRON, *Examiners.*

H. WEAKLEY, *Assistant Examiner.*